No. 743,637. PATENTED NOV. 10, 1903.
D. F. GRAHAM & F. A. FOX.
STARTING DEVICE FOR GAS ENGINES.
APPLICATION FILED MAR. 11, 1903.
NO MODEL.
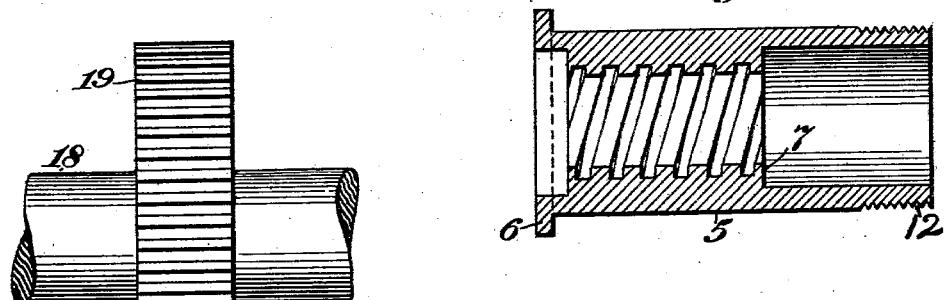
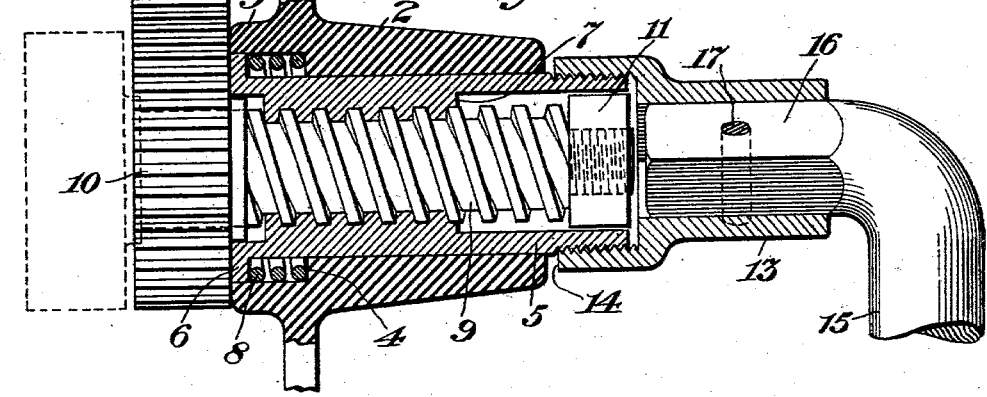
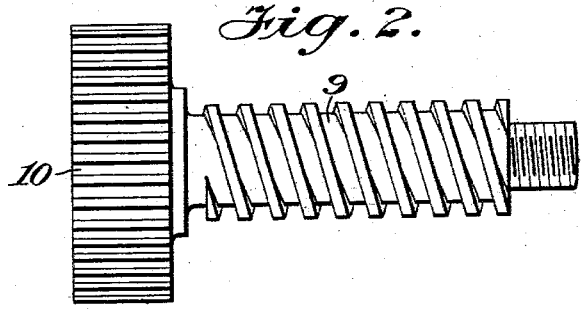

No. 743,637. Patented November 10, 1903.

UNITED STATES PATENT OFFICE.

DAVID F. GRAHAM AND FRANK A. FOX, OF STAMFORD, CONNECTICUT, ASSIGNORS TO THE GRAHAM-FOX MOTOR COMPANY, OF NEW YORK, N. Y., A CORPORATION OF NEW YORK.

STARTING DEVICE FOR GAS-ENGINES.

SPECIFICATION forming part of Letters Patent No. 743,637, dated November 10, 1903.

Application filed March 11, 1903. Serial No. 147,227. (No model.)

*To all whom it may concern:*

Be it known that we, DAVID F. GRAHAM and FRANK A. FOX, citizens of the United States, residing at Stamford, in the county of Fairfield and State of Connecticut, have invented certain new and useful Improvements in Starting Devices for Gas-Engines, of which the following is a specification.

This invention relates to starting devices for explosive-motors, and it is especially designed for use in connection with the motors of automobiles.

A serious objection to many forms of starting mechanism for automobile-motors heretofore used is that they are unreliable in their releasing action and frequently permit the starting-crank to reverse with a forcible revolution, thus endangering the person of the operator or other occupant of the vehicle.

A further objection to the construction of the starting devices just referred to is the employment of clutch-and-ratchet mechanism, which is not only expensive and more or less complicated, but indirect in action and easily disarranged or rendered ineffective by the exigencies of automobile travel.

The primary object of the present invention is to avoid the objections above noted by providing a starting device for motors which will be direct and positive in its action both in connecting with the engine-shaft and in releasing.

A further object of the invention is to provide a starting device comprising few parts or elements, and these of simple and durable construction to adapt them to effectively meet the requirements of automobile service.

The invention comprises an internally-threaded sleeve loosely supported in a bearing of the frame or casing of the machine in parallel relation with a gear-wheel on the motor-shaft, a threaded stem within said sleeve having a gear-pinion at its inner end adapted to mesh with the gear on the motor-shaft, a crank-socket secured to the sleeve, and suitable connections whereby a revolving movement of the sleeve serves to bring the two gears into mesh and revolve the engine-shaft, and the forward motion of the engine-shaft operates to throw the two gear-wheels out of mesh, and thus release the starting-crank.

The construction of the invention will be more fully described hereinafter in connection with the accompanying drawings, which form part of this specification, and its novel and characteristic features will be set forth and defined in the appended claims.

In the drawings, Figure 1 is a sectional elevation of the improved starting device with a portion of a frame-casing and engine-shaft. Fig. 2 is a side elevation of the threaded stem and its pinion, and Fig. 3 is a central longitudinal section of the internally-threaded sleeve within which the stem is supported.

Corresponding parts in all the figures are denoted by the same reference characters.

The reference-numeral 1 designates a portion of the frame or casing of the machine, formed with a bearing comprising a hollow boss 2, projecting from the outer side of the casing, and an annular flange 3, projecting from the opposite side of the casing in alinement with the boss 2 and annularly recessed in its interior to form a shoulder 4. Within the bearing thus formed is loosely and revolubly supported a sleeve 5, formed at its inner end with a collar 6 and interiorly recessed at its opposite end to form an annular shoulder 7. A coil-spring 8 surrounds the sleeve 5 adjacent to its inner end, said spring being interposed between the collar 6 of the sleeve and the shoulder 4 of the bearing.

The sleeve 5 is formed with internal screw-threads to receive the externally-threaded stem 9, carrying at its end a gear-pinion 10 and circumferentially reduced at its outer end to receive a stop-nut 11. The projecting outer end 12 of the sleeve is threaded for the attachment thereto of a socket 13, a space 14 being left between the outer end of the boss 2 and the adjacent end of the socket 13 to permit of a limited longitudinal movement of the sleeve 5.

15 designates a crank the arm 16 of which fits within the socket and is secured therein by a suitable key 17. The position of the engine-shaft 18 with relation to the starting device is shown in Fig. 1, and 19 designates a gear-wheel fixed on said shaft and adapted to mesh with the gear-pinion 10 of the threaded stem.

The utility and operation of the mechanism constructed as thus described will be readily understood by those skilled in the art to which this invention pertains and may be summarized as follows: Normally the stem 9 and its gear-pinion 10 are in the position shown by dotted lines in Fig. 1, the pinion 10 being out of mesh with the motor gear-wheel. To start the motor, the crank 15 is drawn outward, carrying with it the socket 13 and sleeve 5, and as the nut 11 on the stem 9 is in contact with the shoulder 7 of the sleeve the stem 9 and its pinion 10 are also drawn outward, bringing the teeth of the pinion 10 against those of the gear-wheel 19. At the same time the socket 13 is revolved to the right to revolve the sleeve 5, which motion draws the pinion 10 into mesh with the gear-wheel 19 to revolve the motor-shaft, the outward movement of the pinion 10 being limited by its striking against the flange 3 of the casing. As soon as the engine is started the forward movement of the shaft 18 and gear-wheel 19 carries the pinion 10 inward in advance of the sleeve 5 through the intermediacy of the screw-threaded stem, the sleeve being projected under the tension of the spring 8 to bring the socket 13 against the boss 2 of the casing. It will be obvious that the throwing out of gear of the pinion 10 and gear-wheel 19, as just described, will release the crank 15, socket 13, and sleeve 5 from connection with the motor-shaft, such releasing action being direct and positive through the screw action of the stem within the sleeve.

The construction above described provides a reliable and effective starting device in which the employment of clutch mechanism and pawl-and-ratchet connections is avoided, and the releasing action is effected by the positive motion of a screw.

We would have it understood that the invention is not restricted to the exact construction shown, but includes all such variations and modifications in the details as may be resorted to without departing from the spirit and scope of the invention as set forth in the following claims.

Having thus described our invention, we claim and desire to secure by Letters Patent—

1. A starting device for motors, comprising a pinion on the motor-shaft, an internally-threaded and longitudinally-movable sleeve journaled adjacent thereto, a threaded stem supported in the sleeve and carrying a gear-pinion, and means for imparting a longitudinal and revolving movement to said sleeve to connect said pinions and revolve the motor-shaft.

2. A starting device for motors, comprising the combination with an internally-threaded sleeve, supported within a bearing in parallel relation with the motor-shaft and capable of longitudinal movement therein, of a threaded stem working within the sleeve, a gear-pinion on said stem adapted to mesh with a gear-wheel on the motor-shaft, and a crank-socket secured to said sleeve.

3. A starting device for motors, comprising the combination with an internally-threaded sleeve supported within a bearing in parallel relation with the motor-shaft and capable of longitudinal movement therein, of a gear-wheel on said shaft, a threaded stem within said sleeve, a gear-pinion on said stem adapted to mesh with said gear-wheel, a crank-socket secured to the sleeve, and means for limiting the longitudinal movement of said sleeve.

4. A starting device for motors, comprising the combination with an internally-threaded sleeve supported within a bearing, in parallel relation with the motor-shaft and capable of longitudinal movement therein, a threaded stem within said sleeve, a gear-pinion on said stem adapted to mesh with said gear-wheel, a crank-socket secured to said sleeve, a crank fitted to the socket, means for limiting the longitudinal movement of the sleeve, and a spring for projecting said sleeve longitudinally.

5. A starting device for motors, comprising the combination with an internally-threaded sleeve supported within a bearing, in parallel relation with the motor-shaft and capable of longitudinal movement therein, of a gear-wheel on said shaft, a threaded stem within said sleeve, a pinion on one end of said stem, a stop device at the opposite end of the stem, a socket secured to the sleeve, a crank secured within the socket, and means for projecting the sleeve longitudinally.

6. The combination with a casing formed with a bearing, of a starting device comprising an internally-threaded sleeve mounted in said bearing and capable of longitudinal movement therein, and internally recessed to form an annular shoulder, a threaded stem within the sleeve, a gear-pinion at one end of said stem adapted to mesh with a gear on the motor-shaft, a stop device at the opposite end of said stem adapted to bear against the shoulder of the sleeve, a socket secured to the sleeve and adapted to contact with the end of said bearing, and a crank-handle secured within the socket.

7. The combination with a casing provided with a bearing having an internal annular shoulder, of a starting device comprising an internally-threaded sleeve having an external shoulder at its inner end, and an internal annular shoulder, a threaded stem within the sleeve, a gear-pinion on one end of said sleeve adapted to mesh with a gear-wheel on the motor-shaft, and a stop device at the opposite end of said stem to contact with the inner shoulder of the sleeve, a spring interposed between the outer shoulder of the sleeve, and the shoulder of the bearing, and means for moving said sleeve and stem longitudinally.

In testimony whereof we have signed our names in the presence of the subscribing witnesses.

DAVID F. GRAHAM.
FRANK A. FOX.

Witnesses:
F. O. McCLEARY,
J. CLARK PYBAS.